US011223538B1

(12) United States Patent
Arumugam et al.

(10) Patent No.: US 11,223,538 B1
(45) Date of Patent: Jan. 11, 2022

(54) INTELLIGENT DATA TRAFFIC ROUTING IN A WIDE AREA NETWORK

(71) Applicant: Hewlett Packard Enterprise Development LP, Houston, TX (US)

(72) Inventors: Ponnu Velu Arumugam, Santa Clara, CA (US); Rajesh Mirukula, Santa Clara, CA (US); Goutham Damalcheruvu, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 17/018,588

(22) Filed: Sep. 11, 2020

(51) Int. Cl.
*H04L 12/24* (2006.01)
*H04L 12/26* (2006.01)
*H04L 12/751* (2013.01)
*H04L 12/721* (2013.01)
*G06F 15/16* (2006.01)

(52) U.S. Cl.
CPC ...... *H04L 41/5009* (2013.01); *H04L 41/0893* (2013.01); *H04L 43/0823* (2013.01); *H04L 45/08* (2013.01); *H04L 45/26* (2013.01)

(58) Field of Classification Search
USPC ............... 709/224, 227, 238, 221, 220, 229
See application file for complete search history.

(56) References Cited

U.S. PATENT DOCUMENTS

| | | | |
|---|---|---|---|
| 8,046,456 B1* | 10/2011 | Miller | H04L 41/0813 709/224 |
| 9,722,815 B2 | 8/2017 | Mukundan et al. | |
| 9,762,537 B1 | 9/2017 | Evada | |
| 9,800,507 B2 | 10/2017 | Jiao | |
| 9,806,991 B2 | 10/2017 | Lucas et al. | |
| 10,187,478 B2 | 1/2019 | Prabhakar et al. | |
| 2009/0319647 A1* | 12/2009 | White | G09B 19/0053 709/221 |
| 2012/0307697 A1* | 12/2012 | Mukhopadhyay | H04W 24/02 370/311 |
| 2019/0123978 A1* | 4/2019 | Shaw | H04W 4/24 |
| 2019/0386918 A1 | 12/2019 | Iyer et al. | |
| 2020/0045179 A1* | 2/2020 | Firpo | H04M 3/436 |
| 2020/0068025 A1* | 2/2020 | Duran | H04M 3/5116 |

* cited by examiner

*Primary Examiner* — Jude Jean Gilles
(74) *Attorney, Agent, or Firm* — Hewlett Packard Enterprise Patent Department

(57) ABSTRACT

An example network orchestrator includes processing circuitry and a memory including instructions that can be executed by the processing circuitry to cause the network orchestrator to take certain actions. The network orchestrator transmits an initial DPS configuration to a first set of network infrastructure devices. The network orchestrator receives network operation information. The network orchestrator updates a machine learning model by training the model using the network operation information. The network orchestrator transmits an updated DPS configuration generated by the updated machine learning model.

20 Claims, 5 Drawing Sheets

INTELLIGENT DATA TRAFFIC ROUTING IN A WIDE AREA NETWORK

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and headend gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

One of the tradeoffs when switching from private, managed links (e.g. MPLS) to public, unmanaged links (e.g. DSL, cellular, broadband, etc.) is that the performance of the public links is not guaranteed. Having a network administrator manually assign the application data flows to links may work successfully for periods of time, but often leads to network degradation and outages when the assumptions made by the network administrator do not apply. As a simple example, a branch office network configured by the administrator to route video conferencing data traffic through a certain uplink may operate properly in normal operating circumstances (a relatively low number of video conferencing streams active at any one time). However, the static configuration may not operate well when the entire branch office is participating in company-wide conference call due to the large number of active video conferencing streams overwhelming the assigned uplink. Service level agreements (SLAs), which are network health and bandwidth threshold requirements for transacting data associated with certain applications, may be put in place by the network administrator, and the uplink's violation of the SLAs for video conferencing is alerted to the network administrator for manual reconfiguration.

Dynamic path selection (DPS) introduces adaptiveness to the routing decision. Rather than requiring the network administrator to foresee all different network traffic conditions, the network administrator can configure the SLAs for the applications, but instead of merely alerting when the SLA is violated, the network (usually via a network orchestrator or a branch gateway) may reorganize the data traffic in a way that rebalances or otherwise resolves an impending or occurring SLA violation.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
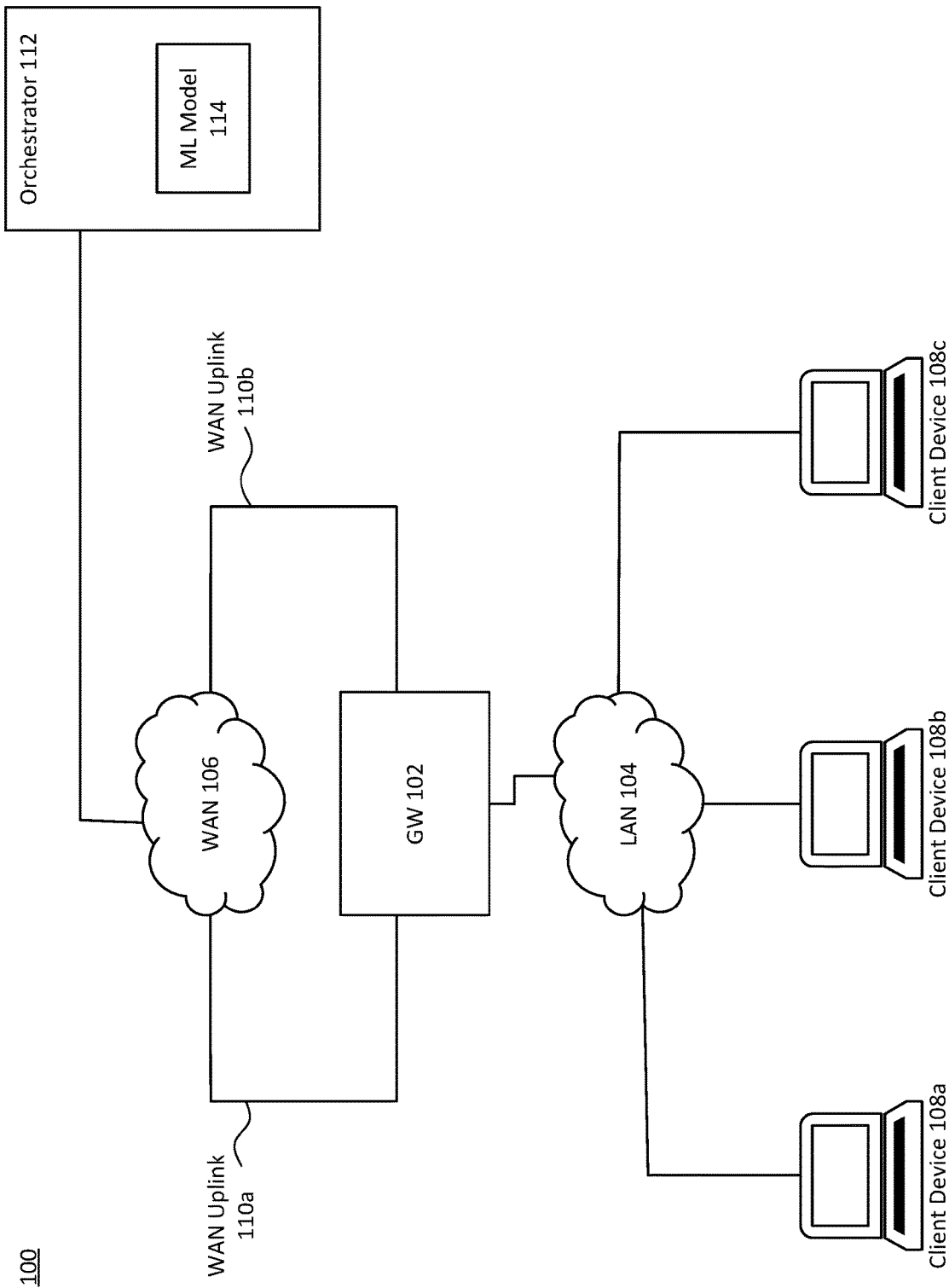
FIG. 1 illustrates an example software defined wide area network.

Certain examples have features that are in addition to or in lieu of the features illustrated in the above-referenced figures. Certain labels may be omitted from certain figures for the sake of clarity.

DETAILED DESCRIPTION

Although dynamic path selection (DPS) adds adaptability to the links connecting a local area network (LAN) to the broader wide area network (WAN) while reducing network administrator effort, there is still a substantial amount of manual administrator configuration required on the "demand" side of the bandwidth equation. In a DPS solution, service level agreements (SLAs) are manually configured per application, and then are statically configured as DPS policies and applied whenever a data connection is established for the relevant application. Resultantly, uplink bandwidth may be underutilized, and network administrator intervention is still required to tune the network.

Although network health is variable over time, often there are patterns in the behavior of the network that are correlated with network health trends. Some of these patterns can be relatively simple (e.g. bandwidth usage at a California branch site is higher during California business hours), but often the patterns are more complex, and the superposition of multiple patterns makes it difficult, if not impossible, for a network administrator to understand a network's health trends, especially in a large enterprise network. Common solutions, such as rule based reconfiguration of the network, are limited in their ability to capture complicated network and application traffic patterns, react to unexpected network changes, and are effort intensive for network administrators, especially at scale.

The following describes an example implementation of the invention described in this disclosure. In order to better capture complicated network and application patterns, a machine learning model on a network orchestrator gathers relevant network operation data from a branch gateway and generates updated DPS configuration information, including DPS policies that are designed to accommodate the expected application traffic (based on predicted SLAs and the expected network health and available bandwidth of uplinks of the branch gateway). DPS policies include information used by network infrastructure devices to identify and route flows across an appropriate WAN route. The machine learning model can be centrally located and service multiple branch LANs across the WAN. Thus, the trained and updated models for differently configured branch LANs may diverge from one another. For example, a branch site in Los Angeles may have a SLA for Microsoft Office 365 data traffic that defines a certain maximum latency X and a certain maximum jitter Y. A different branch site in Rio De Janiero may have difficulty identifying any suitable uplink or combination of uplinks if the same static SLA of X maximum latency and Y maximum jitter is applied to Office 365 data there. This may result in the relevant DPS policy unnecessarily "flapping" (switching between uplinks) the Office 365 sessions, degrading the end user experience.

In this example, Rio De Janiero's network operation data is sent to a centralized network orchestrator (e.g. a cloud network controller), where the network operation data is input into the machine learning model to which Rio De Janiero's LAN has been assigned. The machine learning model periodically predicts application SLAs for Rio De Janiero, generates DPS policies corresponding to the predicted SLAs and transmits those DPS policies to a controller (e.g. branch gateway) in the Rio site as part of a DPS configuration. For example, the machine learning model may receive network operation data from Rio indicating that the current SLA for Office 365 applications is not being met most of the time. The new predicted SLA for Office 365 applications may change from X maximum latency and Y maximum jitter to X+Z maximum latency and Y+Z maximum jitter, which is more likely to be met by the uplinks at the Rio site. This new predicted SLA is used to generate a DPS policy for routing Rio site Office 365 data traffic, and the DPS policy is transmitted to the Rio branch gateway as part of a DPS configuration update. Once the DPS policy is implemented by the Rio branch gateway, Office 365 traffic is routed per the DPS policy.

As previously mentioned, solving a WAN uplink "problem" requires accounting for multiple variables. Adjusting SLAs is one option for improving routing performance, but the SLAs are often tied to real-world limitations. For example, a streaming video application may be able to function with and adapt to a certain amount of increased latency, but at some point, increasing the latency results in appreciable degradation of the end user's experience. Likewise, forward error correction may be able to reassemble a certain number of dropped packets, but beyond that certain number, data is lost. As a result, adjusting SLAs is often considered to be a method to be used when more substantial network challenges are encountered, with the network relying on other techniques to optimize networks with less substantial challenges.

Another technique used alongside SLA updates by this example is bandwidth reservation. Rather than manually establishing rules that independently adjust the route each flow takes based on uplink health information, each uplink is bucketized by a machine learning model and per DPS policy based on how well the relevant application SLA is met. In this example, there are 5 buckets, A, B, C, D, E, forming a spectrum from "consistently meets SLA with a large margin" to "consistently does not meet SLA by a large margin". Using this information, the network orchestrator can automatically select a best uplink or uplinks to update the relevant DPS policy to prefer. The machine learning model also predicts the amount of available bandwidth for each uplink, and reserves a portion of the bandwidth based on each application type. This bandwidth reservation is taken into account when generating the DPS policies, and may result in some applications not being routed through the "best" uplink as measured by SLA bucket. Rather, the SLA bucketization is balanced with the bandwidth availability of each uplink when determining which flows are routed through which uplinks. Continuing the above example, the Rio De Janiero site has 3 uplinks (uplink 1, uplink 2, and uplink 3), and uplink 1 is in the B bucket for Office 365 traffic, uplink 2 is in the D bucket for Office 365 traffic, and uplink 3 is in the E bucket for Office 365 traffic. Assuming that there is no issue reserving the required bandwidth, the network orchestrator provides a DPS policy preferring that Office 365 flows are routed through uplink 1 to take advantage of the uplink that meets SLA consistently but narrowly. As additional iterations of training the machine learning model using network operating information occur, the bucketization of the Rio uplinks may change in relation to Office 365 traffic, resulting in a change to the DPS policy for Office 365 traffic for the Rio branch gateway. It should be appreciated that additional iterations provide additional data to the machine learning model, which can improve the model's accuracy and predictive ability.

Combined together, the techniques used in this example work together as follows. Over relatively short periods of time (e.g. 10 minute increments), uplinks are bucketized on a per-policy basis, and adjustments are made to DPS policies where beneficial. Over longer periods of time, if the network is struggling to meet SLA for an application across all uplinks (or is consistently meeting SLA with a large margin across all uplinks) the SLA is adjusted to either reduce the demands of the application (in the case where the network is struggling to meet SLA for the application) or increase the buffer beyond minimal application requirements (in the case where the network is consistently meeting SLA with a large margin across all uplinks).

As could be recognized by a person having ordinary skill in the art, many of the components, algorithms, thresholds, and processes could be configured differently and still provide similar advantages over traditional WAN networking solutions. A non-exhaustive, non-limiting list of such anticipated changes include using predictive algorithms other than machine learning models, staging components of the invention on different devices, including in a distributed manner, applying the invention to LAN, datacenter, or other network scopes and segments, altering schedule durations, altering thresholds, altering which points of data are input into the machine learning model, allowing manual override in part or on the whole, grouping and excluding uplinks from consideration by the machine learning model, etc. To the extent that the examples in this disclosure are focused on one particular configuration, these examples are not intended to be limiting, and are so focused solely to improve clarity and readability of this document.

FIG. 1 illustrates an example software defined wide area network (SD-WAN). SD-WAN 100 includes a branch gateway (GW) 102, local area network (LAN) 104, wide area network (WAN) 106, client devices 108a-c, WAN uplinks 110a-b, network orchestrator 112, and machine learning model 114. SD-WAN 100 may be an enterprise network, such as a network run by a company with one or more employee sites. GW 102, LAN 104, and client devices 108a-c combine to represent a branch site of the SD-WAN 100. While the term "branch site" is named after a branch office of a company, the term has a broader meaning that encompasses LANs 104 primarily hosting client devices 108 rather than servers and other data providing devices.

SD-WAN 100 has two WAN uplinks, uplink 110a and uplink 110b. These uplinks can be various technologies, including digital subscriber line (DSL), fiber optic (FloS), cellular (3G, 4G, 5G, etc.), or any other appropriate technology. Although two uplinks are shown in FIG. 1, any number of uplinks is contemplated, and each uplink 110 can also be representative of a group of uplinks that are handled collectively. Each client device 108a-c is communicatively coupled, directly or indirectly, to GW 102 via LAN 104. LAN 104 may be as simple as an ethernet cable connecting each client device 108a-c to GW 102 or as complicated as a multi layer switching and routing topology. Client devices 108a-c may interact with network-hosted applications hosted across WAN 106. The network-hosted applications may be hosted at a data center in another part of WAN 106, on the cloud, or on a public server across the Internet. When application-related data traffic is transmitted by a client device 108a destined for a devices across WAN 106, GW 102 classifies the traffic into a flow. For example, traffic destined for a Microsoft Word Online server may be classified into an Office 365 flow. The flow corresponds to a related dynamic path selection (DPS) policy that causes the flow to be forwarded along a certain route described in the policy. Specifically, the policy selects a preferred uplink 110 to forward the data traffic through. DPS policies may be of various scopes. In some examples, DPS policies may be defined for each differentiable application transacting data across the network. In other examples, only a small number (5 or less) of DPS policies are defined, and applications are sorted into broad application classes. As can be appreciated by a person having ordinary skill in the art, the scope of DPS policies could involve application classes of any size, and combinations of any different number of application class sizes. Manually configured DPS policies may also co-exist alongside these automatically generated DPS policies. In some examples, DPS policies include bandwidth thresholds, latency thresholds, jitter thresholds, and a list of applications contained within the respective application category.

On initialization of the network (or of the branch site, or after a reset of GW 102), network orchestrator 112 generates a DPS configuration for GW 102 and transmits the DPS configuration to GW 102. The source information used to generate the DPS configuration depends on whether the network or branch site is new or whether there is historical or current operating information about the operation of that branch site.

If there is no historical or current operating information available, then the DPS configuration is generated based on initialization data, which may include initial DPS policies for the application classes, initial scheduling information for iterative updating of the DPS configuration, and initial service level agreements (SLAs) for the application classes. Service level agreements are performance requirements for uplinks 110 to be able to transceive traffic associated with the respective application class. For example, when client device 108a is participating in a video conference, an initial SLA associated with the application traffic for the video conference may require a maximum latency of 50 ms, a maximum jitter of 15 ms, and a maximum packet loss of 2%.

If historical or current operating information is available, the DPS configuration is generated by machine learning model 114 that takes historical and current operating information as input, and outputs predicted per-uplink health, per-uplink available bandwidth, and per-application SLAs, which are used to generate the DPS configuration.

As applications transact their traffic through WAN 106, GW 102 gathers network operating information relating to the behavior of traffic for each application as it passes through WAN uplinks 110. Periodically (as configured in the DPS configuration), GW 102 transmits the gathered network operating information to network orchestrator 112. Network orchestrator 112 may also receive additional network operating information from other branch gateways of other branch sites. In some examples, each branch site has a unique machine learning model 114 associated with the site. In some other examples, branch sites are grouped based on similarity, and similar branch sites share machine learning models 114. In examples where the network orchestrator 112 is a cloud service shared across multiple tenants, machine learning models 114 may or may not be shared across tenants, depending on preference. Machine learning model 114 receives the network operating information as an input and predicts parameters used in generating a DPS configuration.

The network operation information may include various parameters measuring uplink health (e.g. latency, jitter, packet drop, etc.), uplink available bandwidth, responses to active probes sent by GW 102 across WAN uplinks 110, application data traffic information collected passively by GW 102 while transceiving the application data traffic, SLA violations, geographic location of the branch site, internet service provider for each uplink, and other applicable metrics.

Machine learning model 114 is updated by training on the network operation information. Then machine learning model 114 predicts SLA profiles per application for the branch site, predicts link health and available bandwidth per uplink for the branch site, and generates a DPS configuration for the branch site. The DPS configuration may include DPS policies, SLAs, probe profiles for the active probes across the WAN uplinks 110, and scheduling configurations for gathering and transmitting the network operation information. The network orchestrator 112 then transmits the DPS configuration to GW 102, who implements the DPS configuration on the branch site. In some examples, machine learning model 114 includes one or more forest regression models to predict application SLAs, predict available bandwidth, and/or generate DPS configurations. As can be appreciated by a person having ordinary skill in the art, machine learning model 114 could be a different kind of model, as is appropriate given the context. In some examples, GW 102 receives the DPS configuration and implements the configurations without network administrator intervention, including applying the DPS policies of the DPS configuration to the branch site.

In certain examples, the network orchestrator 112 also transmits the DPS configuration to another GW in a LAN that is similar to LAN 104. Generally, in some examples, similar branch sites may be grouped together and operate on a single DPS configuration generated by a single machine learning model 114.

In order to generate accurate results, machine learning model 114 preprocesses certain network operating information. In some examples, the information used as inputs into the preprocessing algorithm (per application and per uplink) includes total bandwidth percentage used by the DPS policy associated with the respective application class, underlay traffic used percentage, overlay traffic used percentage, overlay traffic used percentage per headend gateway, number of headend gateways terminating WAN connections for the application type, average total available bandwidth percentage for the respective uplink. Machine learning model 114 then classifies each DPS policy-uplink combination based on how well SLA is met. For example, machine learning model 114 may classify each policy-uplink in one of five buckets: A, B, C, D, E. Bucket A is for uplinks that consistently meet SLA by a large margin (e.g. +50% and above) or a medium margin (e.g. +10% to +50%). Bucket B is for uplinks that consistently meet SLA by a small margin (e.g. 0% to +10%). Bucket C is for uplinks that fluctuate frequently above and below SLA (e.g. fluctuate at least 3× in the prior 30 minutes). Bucket D is for uplinks that are not consistently meeting SLA, but by a narrow margin (e.g. −10% to 0%). Bucket E is for uplinks that are not consistently meeting SLA, by a medium margin (e.g. −50% to −10%) or a large margin (−50% and below).

As previously mentioned, there are multiple techniques for adjusting the network, and some techniques are more disruptive to network activity than others. One such potentially disruptive technique is altering the SLA for an application. Thus, machine learning model 114 may compare the classification results for each application class to a set of thresholds before determining whether to alter the SLA from the current values. For example, the thresholds for altering the SLA for an application class may be to change the SLA when (1) all uplinks are in bucket E (for the application class) for the prior 30 minutes, increase the SLA thresholds (i.e. reduce the difficulty of meeting the SLA) by 20%; (2) all uplinks are in bucket D and/or E for the prior 30 minutes, increase the SLA by 10%; (3) all uplinks are in bucket A for the prior 3 hours, decrease the SLA by 10%. This example highlights a philosophy that can be used for using the DPS policy adjustment and SLA adjustment techniques complementarily. Within the SLA thresholds (when SLA will not be changed by machine learning model 114), DPS policies are adjusted to route application traffic through the uplinks efficiently. When DPS policy adjustment is unable to efficiently route traffic for an application class over a long period of time, the SLA is adjusted for that application class to better fit the network conditions.

Figure 2:
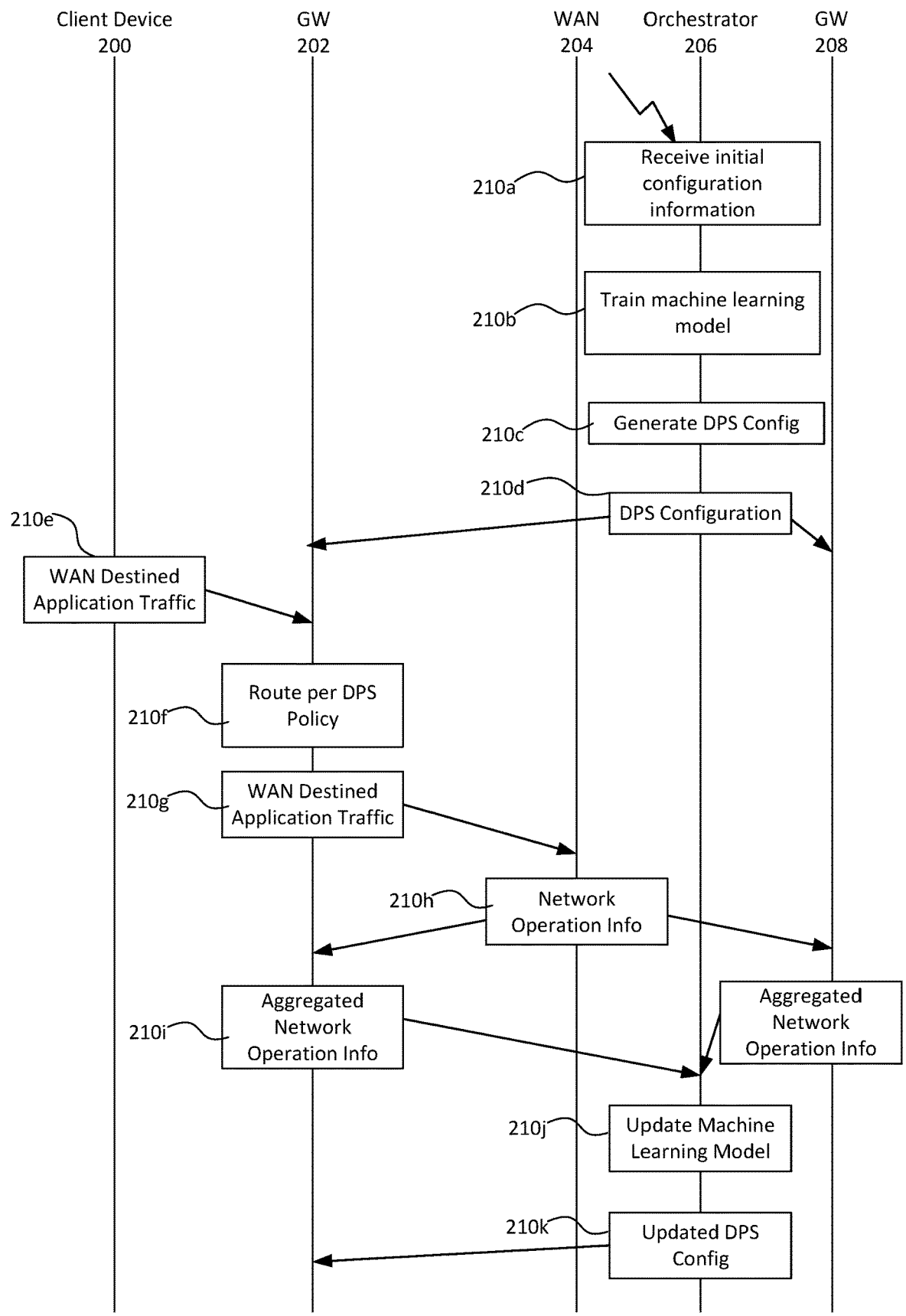
FIG. 2 is a dataflow diagram illustrating the operation of an example software defined wide area network.

FIG. 2 is a dataflow diagram illustrating the operation of an example software defined wide area network. The dataflow diagram illustrates the flow of information throughout the networking system. The vertical lines represent client device 200, branch gateway (GW) 202, WAN 204, Orchestrator 206, and branch gateway (for similar branch site) 208. Time progresses from the top of the diagram to the bottom.

In block 210*a*, orchestrator 206 receives initial configuration information. This configuration information may include initial SLAs for a set of application classes, scheduling information for the periodic updates of the machine learning model, threshold information for the techniques for optimizing the network, probing configuration information for the active probes of the WAN uplinks, etc. In some examples, the initial configuration information is input by a network administrator. In some other examples, portions of the initial configuration information are input by a network administrator and portions of the initial configuration information are preconfigured into network orchestrator 206.

In block 210*b*, orchestrator 206 trains a machine learning model based, in part, on the initial configuration information. In some examples, the machine learning model may be pretrained with initial configuration information and this initial training is not required. In some other examples, the initial configuration information is used to train a machine learning model to generate a DPS configuration for the branch site including GW 202. In certain examples, orchestrator 206 determines that additional branch sites are similar to the branch site including GW 202, such as the branch site including GW 208. The machine learning model may be any appropriate model type, such as a forest regression model. The machine learning model is configured to generate DPS configurations by predicting application class SLAs, uplink health, and uplink available bandwidth.

In block 210*c*, orchestrator 206 generates a DPS config from the output of the machine learning model. In some examples, the output of the machine learning model is a DPS configuration that can be transmitted to GW 202. In some other examples, the output of the machine learning model must be post-processed to generate the DPS config. For example, the machine learning model may output multiple values (e.g. SLAs for application classes, DPS policies, uplink available bandwidth predictions, etc.), and a prost-processing algorithm consolidates the outputs into a DPS configuration.

In block 210*d*, the DPS configuration is transmitted from orchestrator 206 to GW 202 and GW 208. Each GW 202 and 208 then implements the DPS configuration. In some examples, this involves implementing DPS policies, SLAs, probe configurations, schedule configurations, etc. In certain examples, some portions of the DPS configuration are unchanged in comparison to the current configuration of the GW 202 or 208, and thus that portion of the GW configuration is not updated.

In block 210*e*, client device 200 sends and receives application traffic that is destined for a device on WAN 204. This device may be a datacenter server, an Internet server, a cloud server, or any other relevant WAN-site destination. LAN routing rules forward the application traffic to GW 202, which identifies the application. In some examples, GW 202 may forward a portion of the application traffic (e.g. a packet, set of packets/frames) to a separate device for application identification. In certain examples, GW 202 forwards the application traffic to orchestrator 206, which identifies the application directly, or by forwarding to another device (e.g. an application identifier device, a third-party application identification service). Once the application is identified, further data traffic associated with the relevant network session are automatically associated with the relevant flow and are routed without requiring additional identification.

In block 210*f*, GW 202 associates the application traffic with a flow and selects a route for the application traffic based on the relevant DPS policy. The DPS policy includes an uplink of the set of uplinks connecting GW 202 to WAN 204 through with the application traffic should be routed.

In block 210*g*, GW 202 forwards the application traffic through the uplink included in the relevant DPS policy to WAN 204. Depending on the specific destination of the application traffic, the next hop of the route may be a headend gateway of a different WAN site, or the application traffic may "peel off" of the WAN and route directly (i.e. without any more WAN hops) through the Internet to its destination.

In block 210*h*, WAN 204 supplies network operation information to GWs 202 and 208, including responses to active probes sent to WAN 204 via uplinks between the respective GWs and WAN 204. In some examples, the network operation information is generated at one or more headend gateways in WAN 204. The network operation information includes parameters that indicate the network's health, including, among other parameters, response information from active uplink probes, passive application data traffic information, per-uplink bandwidth, network infrastructure device operating parameters, SLA violations, geographic location, and per-uplink internet service provider.

In block 210*i*, GW 202 aggregates network operation information associated with the operation of GW 202 and associated uplinks, including the network operating information from WAN 204, as well as network operation information measured at GW 202, and forwards the aggregated network operation information to orchestrator 206. Similarly GW 208 aggregates and forwards network operation information to orchestrator 206.

In block 210j, since GW 202 and GW 208 are in similar LANs and use the same machine learning model to generate their DPS configurations, orchestrator 206 uses the aggregated network operation info from GW 202 and the aggregated network operation info from GW 208 to update the machine learning model. Updating the machine learning model may include training the machine learning model using the aggregated network operation information to generate new predictions as previous described.

In block 210k, an updated DPS configuration is generated by the updated machine learning model. Depending on the specific network health and other factors, the updated DPS configuration may adjust DPS policies to route applications differently than before, adjust SLAs to reduce or increase the bandwidth reservation for applications on the uplinks, alter how probes are configured or how updates are scheduled, or make other changes to the DPS configuration to improve operation.

Figure 3:
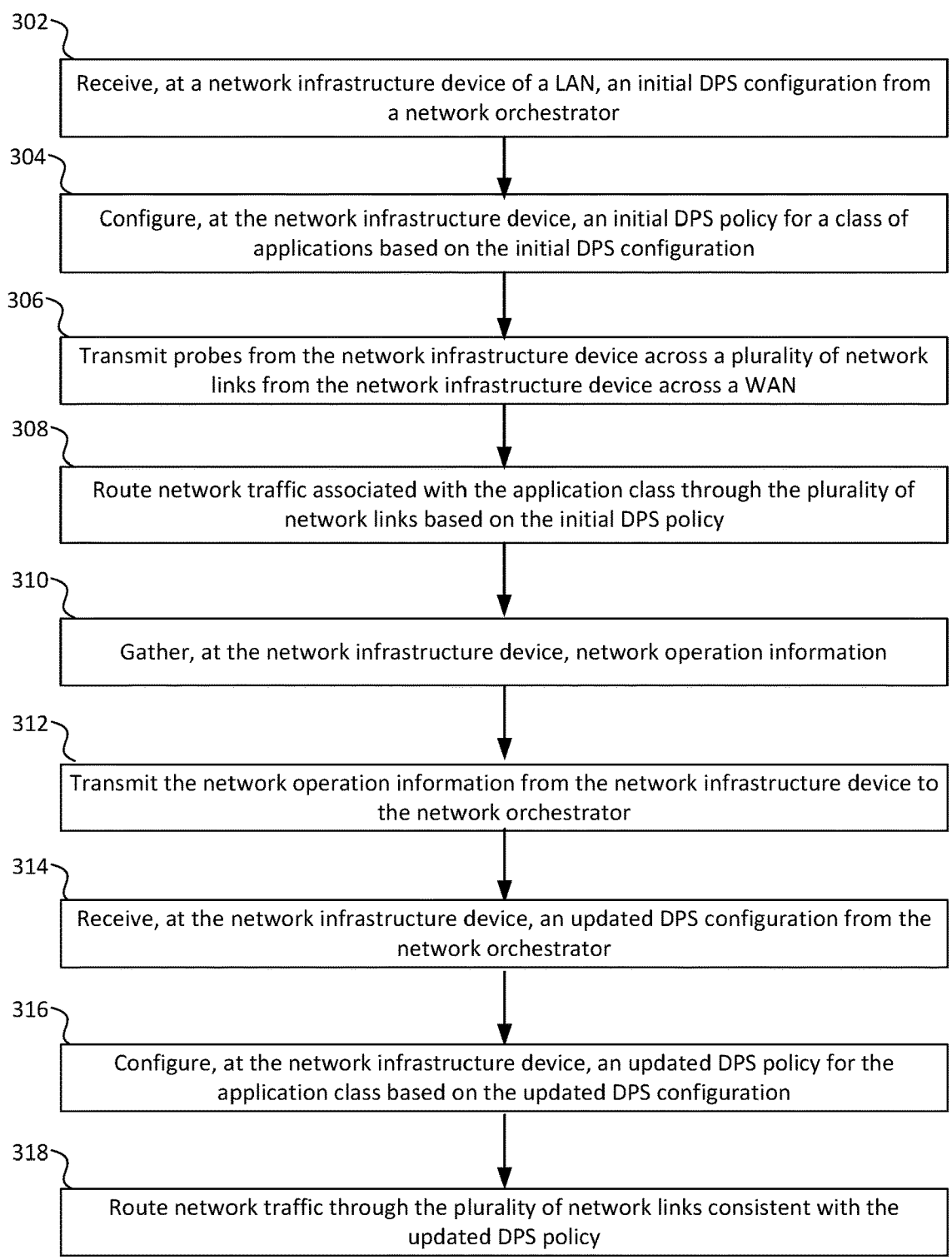
FIG. 3 is a flowchart illustrating an example method for configuring a software defined wide area network.

FIG. 3 is a flowchart illustrating an example method for configuring a software defined wide area network. Method 300 may be implemented as instructions on a computer readable medium that are executed by processing circuitry.

In block 302, a network infrastructure device of a LAN within a WAN receives an initial DPS configuration from a network orchestrator. In some examples, the initial DPS configuration is preconfigured at the network orchestrator due to a dearth of information about the operation and topology of the LAN. In some other examples, initial network operation and topology information is collected from the LAN and input into a machine learning model to generate the initial DPS configuration. In certain examples, the initial DPS configuration includes some initial configurations input by a network administrator. In certain other examples, the initial DPS configuration includes some initial configurations that are preconfigured, and no network administrator configuration is required to generate the initial DPS configuration.

In block 304, an initial DPS policy is configured at the network infrastructure device for a class of applications based on the initial DPS configuration. In some examples, the initial DPS policy is included in the initial DPS configuration, and the initial DPS policy is configured by copying the policy from the initial DPS configuration to a policy repository within the network infrastructure device. In some other examples, information from the initial DPS configuration (e.g. SLAs) are combined with information from the network infrastructure device (e.g. network topology) to configure the initial DPS policy.

In block 306, probes are transmitted from the network infrastructure device across a plurality of network links (i.e. uplinks) connecting the network infrastructure device to other device across the WAN. In some examples, the uplinks span across the Internet to other LANs of the WAN in a SD-WAN topology. The probes may traverse the underlay network (the physical links and network devices of the network) that is selected as the path for the overlay route (the logical connection between the network infrastructure device, which may be a branch gateway of a branch LAN, and another network infrastructure device, which may be a headend gateway of a core site LAN) of the uplink to determine the uplink health. Determination of uplink health can be accomplished by gathering information and meta-information from responses to the probes. Uplink health parameters may include jitter, latency, packet loss, both total across the uplink and per application class.

In block 308, network traffic that is associated with the application class (i.e. the application class flow) is routed by the network infrastructure device through the associated uplink as described in the initial DPS policy. In some examples, a network session used to transmit the network traffic is categorized as being associated with the application class after an initial amount of network traffic is inspected to determine which application it is associated with. In some examples, the DPS configuration may include a list of applications associated with each application class.

In block 310, the network infrastructure device gathers network operation information. Some of the network operation information may be measured at the network infrastructure device. Other network operation information may be received from other devices, including other network infrastructure devices of the LAN, client devices of the LAN, other network infrastructure devices of other LANs within the WAN, and network infrastructure devices of the Internet, and data server devices of the LAN, WAN or Internet. Some network operating information may be application class specific, whereas other network operation information is focused on network health as a whole.

In block 312, the aggregated network operation information is transmitted from the network infrastructure device to the network orchestrator. The network orchestrator may gather network operation information from many LANs within the WAN and from LANs in different WANs that are similar to the LAN containing the network infrastructure device described in method 300. In some examples, the network orchestrator operates and maintains a machine learning model that is shared across LANs that are similar in topology and/or health. In some examples, the network operation information is used to train the machine learning model periodically.

In block 314, an updated DPS configuration is received at the network infrastructure device from the network orchestrator. In some examples, the network orchestrator receives the network operating information from the network infrastructure device and from network infrastructure devices in similar LANs to the network infrastructure devices described in method 300, and inputs the network operating information into a machine learning model. The machine learning model predicts uplink health, uplink available bandwidth, and SLAs for application classes, and generates the updated DPS configuration based, in part, on those predictions. In some examples, the machine learning model uses forest regression models to predict the SLAs and the uplink health and available bandwidth.

In block 316, an updated DPS policy for the application class is configured at the network infrastructure device based on the updated DPS configuration. In some examples, the updated DPS policy is included in the updated DPS configuration, and the updated DPS policy is configured by copying the policy from the updated DPS configuration to a policy repository within the network infrastructure device. In some other examples, information from the updated DPS configuration (e.g. SLAs) are combined with information from the network infrastructure device (e.g. network topology) to configure the updated DPS policy.

In block 318, network traffic that is associated with the application class (i.e. the application class flow) is routed by the network infrastructure device through an associated uplink as described in the updated DPS policy. In some examples, a network session used to transmit the network traffic is categorized as being associated with the application class after an initial amount of network traffic is inspected to determine which application it is associated with. In some examples, the updated DPS configuration may include a list of applications associated with each application class.

In some examples, method 300 includes an additional block wherein each uplink of the plurality of networks links is classified at the network orchestrator based on how consistently the link meets application SLAs for network traffic transmitted across the respective link, as well as by what margin the link meets the application SLAs.

In some examples, method 300 includes an additional block wherein updated DPS policies are periodically generated at the network orchestrator for the network infrastructure device to reduce the number of network links classified as not meeting or not consistently meeting their respective assigned application SLAs.

In some examples, method 300 includes an additional block wherein an application SLA is periodically updated by the network orchestrator when all associated uplinks are classified as not meeting the current application SLA for a period of time. In some examples, the application SLA is also periodically updated when all associated uplinks are classified as meeting the application SLA by a large margin for a period of time.

Figure 4:
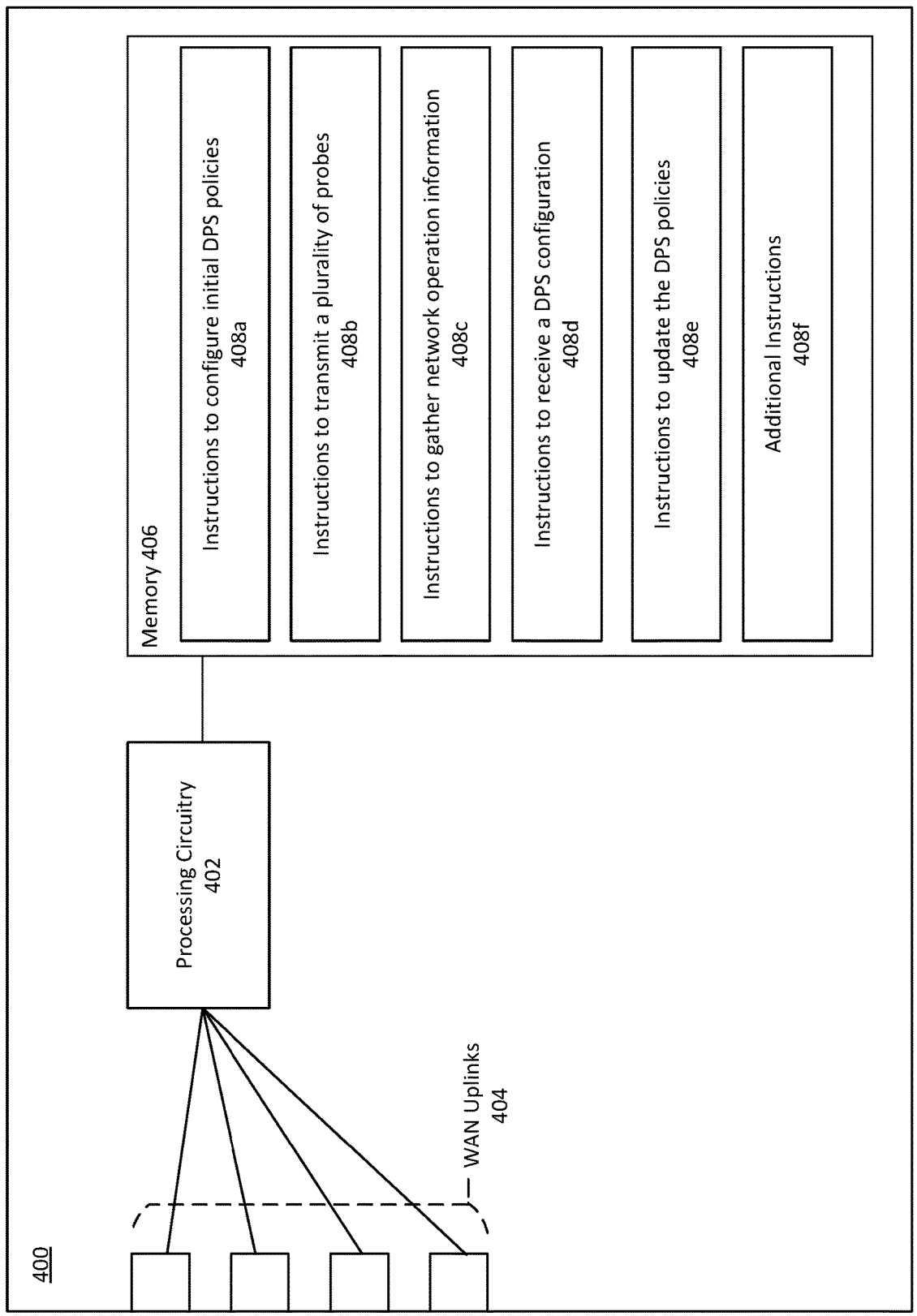
FIG. 4 illustrates an example network infrastructure device.

FIG. 4 illustrates an example network infrastructure device. Network infrastructure device 400 includes processing circuitry 402, WAN uplinks 404, and memory 406. Memory 406 may be a non-transitory computer-readable medium that stores instructions 408 which, when executed by processing circuitry 402, cause network infrastructure device 400 to perform certain actions. In some examples, network infrastructure device 400 is a branch gateway.

Instructions 408a cause device 400 to configure initial DPS policies. In some examples, the initial DPS policies are received from a network orchestrator. The initial DPS policies are each associated with a respective application class of a set of application classes, and instruct device 400 to route network traffic application traffic of the respective application class through a selected uplink of WAN uplinks 404.

Instructions 408b cause device 400 to transmit a plurality of probes across WAN uplinks 404 and receive responses from destination devices across the links. For examples, WAN uplinks 404 may be coupled with one or more headend gateways of different LAN sites, and the responses received from the headend gateways may include information and meta-information that can be used to determine the health and available bandwidth of each uplink.

Instructions 408c cause device 400 to gather network operation information, including the information collected from the responses to the plurality of probes, as well as information measured by device 400 and information collected by devices on the LAN associated with device 400. This aggregated network operation information includes many parameters that can be used by a network orchestrator to determine network topology, link health, available bandwidth, and application class specific network health information. Device 400 may also forward the network operation information to the network orchestrator.

Instructions 408d cause device 400 to receive a DPS configuration from a network orchestrator. In some examples, the DPS configuration includes updated DPS policies for the application classes. Additional updated information may be included, such as updated application class SLAs, updated probing configuration, updated uplink thresholds, and updated scheduling configuration.

Instructions 408e cause device 400 to update its DPS policies based on the received DPS configuration. In some examples, certain DPS policies may remain the same for certain application classes, and other DPS policies are changed for other application classes. Beyond updating its DPS policies, device 400 may update other configurations and parameters based on information supplied in the DPS configuration.

Additional instructions 408f may cause device 400 to undertake other actions, including many described previously in this disclosure. For example, device 400 may route application traffic based on the initial DPS policies, route application traffic based on the updated DPS policies, and transmit information from a new network session to a device that classifies the application type of the session.

Figure 5:
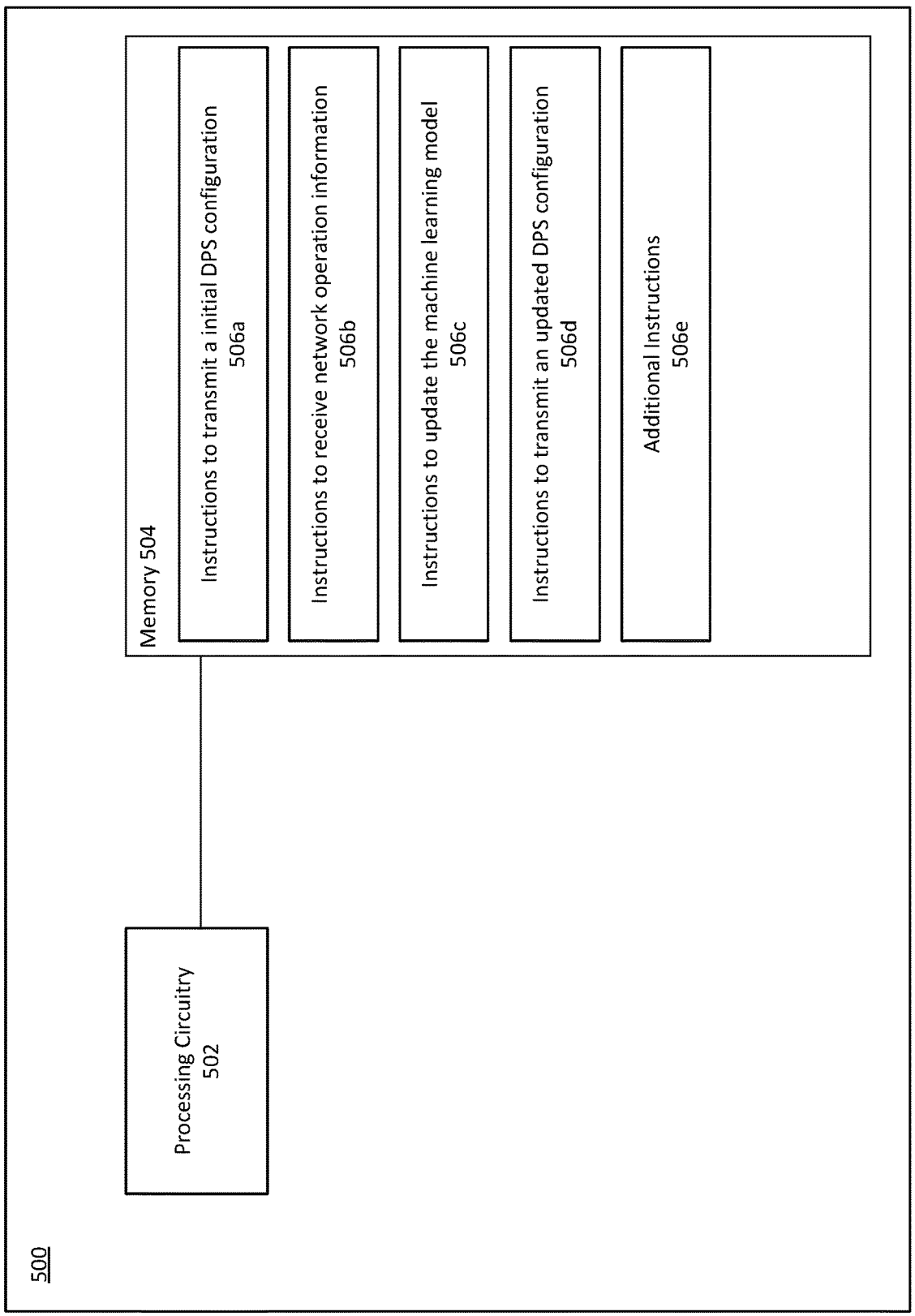
FIG. 5 illustrates an example network orchestrator.

FIG. 5 illustrates an example network orchestrator. Network orchestrator 500 includes processing circuitry 502 and memory 504. Memory 504 may be a non-transitory computer-readable medium that stores instructions 506 which, when executed by processing circuitry 502, cause network orchestrator 500 to perform certain actions. In some examples, network orchestrator 500 is a cloud-hosted network controller.

Instructions 506a cause orchestrator 500 to transmit an initial DPS configuration to a network infrastructure device of a LAN. In some examples, the initial DPS configuration is preconfigured. In some other examples, some preliminary information is collected from the network infrastructure device and used as inputs into a machine learning model to generate the initial DPS configuration. In certain examples, a network administrator configures aspects of the DPS configuration manually, but in other examples, no action is required from the network administrator to generate and transmit the DPS configuration.

Instructions 506b cause orchestrator 500 to receive network operation information from the network infrastructure device. The network operation information includes parameters that can be input into the machine learning model to predict application class SLAs, uplink health, and uplink available bandwidth. In some examples, network operation information from multiple network infrastructure devices of similar LANs are all input into the machine learning model as training data to train the machine learning model.

Instructions 506c cause orchestrator 500 to update the machine learning model using the receive network operation information. The model then outputs a DPS configuration that can be used on each of the network infrastructure devices. In some examples, orchestrator 500 includes multiple machine learning models, each associated with one or more network infrastructure devices, grouped by LAN similarity.

Instructions 506d cause orchestrator 500 to transmit an updated DPS configuration to the network infrastructure device. The updated DPS configuration may include updated DPS policies for each application class, updated SLAs for each application class, updated probe configurations, updated uplink thresholds, and updated scheduler configurations.

Additional instructions 506e may cause orchestrator 500 to undertake other actions, including many described previously in this disclosure. For example, orchestrator 500 may receive information from a network infrastructure device including information from a new network session to classify the application type of the session.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" encompass one or both of the classification of packets to a flow pattern, as well as the path those classified packets take through the SDN overlay network. "Routes" usually refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

Headend gateways (sometimes referred to as VPN concentrators) are network infrastructure devices that are placed at the edge of a core site LAN. Often headend gateways are routers that interface between the LAN and a wider network, whether it be directly to other LANs of the WAN via dedicated network links (e.g. MPLS) or to the other LANs of the WAN via the Internet through links provided by an Internet Service Provider connection. Many headend gateways can establish multiple uplinks to the WAN, both to multiple other LAN sites, and also redundant uplinks to a single other LAN site. Headend gateways also often include network controllers for the core site LAN. In such examples, a headend gateway in use in a SD-WAN may include a network controller that is logically partitioned from an included router. The network controller may control infrastructure devices of the core site LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A virtual local area network (VLAN) is a logical partition of a portion of a WAN. A VLAN may be contained within a certain LAN of the WAN or it may span across multiple LANs of the WAN. VLANs are implemented in layer 2 of the OSI model (the data link layer) and, among other benefits, improve network configurability as the size of the network scales. VLAN capable infrastructure devices may allocate VLANs on a per-port basis or may tag certain data frames with information associating the frames with their respective VLANs. VLANs may be used to group related devices, balance load on certain network infrastructure devices, apply security and routing policies on a broad basis, implement quality of service (QoS), etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

A software defined network (SDN) is a network overlaying a physical network that allows a device, such as a network orchestrator, to dynamically configure the topology of the SDN overlay using flows to specific routes through the underlay physical network. Dynamic configuration can include alterations to the network topology based on many factors, including network health and performance, data type, application type, quality of service restrictions (e.g. service level agreements), device load, available bandwidth, business cost, and other factors.

A software defined wide area network (SD-WAN) is a SDN that controls the interaction of various sites of a WAN. Each site may have one or more LANs, and LANs connect to one another via WAN uplinks. Some WAN uplinks are dedicated lines (e.g. MPLS), and others are shared routes through the Internet (e.g. DSL, T1, LTE, 5G, etc.). An SD-WAN dynamically configures the WAN uplinks and data traffic passing through the WAN uplinks to effectively use the resources of the WAN uplinks.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A network orchestrator, comprising:
  processing circuitry, and;
  a memory including instructions that, when executed by the processing circuitry, cause the network orchestrator to:
    transmit an initial dynamic path selection (DPS) configuration, generated by a machine learning model, to a first set of network infrastructure devices;
    receive, from each of the first set of infrastructure devices, network operation information;
    update the machine learning model by training the machine learning model using the network operation information received from each of the first set of infrastructure devices; and
    transmit an updated DPS configuration, generated by the updated machine learning model, to the first set of network infrastructure devices.

2. The network orchestrator of claim 1, wherein the network operation information includes: response information from active uplink probes, passive application data traffic information, per-uplink bandwidth, SLA violations, geographic location, and per-uplink internet service provider.

3. The network orchestrator of claim 1, wherein the initial and updated DPS configurations include at least one of: DPS policies, SLAs, probe profiles, or uplink schedule configurations.

4. The network orchestrator of claim 3, wherein the machine learning model uses forest regression models to predict application service level agreements (SLAs) and uplink health and available bandwidth for use while generating DPS configurations.

5. The network orchestrator of claim 3, wherein the DPS policies include a list of applications within the respective application category, and one or more of: bandwidth threshold, latency threshold, or jitter threshold.

6. The network orchestrator of claim 1, wherein upon receiving the updated DPS configuration, the first set of network infrastructure devices update their respective DPS policies without any network administrator action.

7. The network orchestrator of claim 1, further including instructions that cause the network orchestrator to update a second machine learning model with network operation information received from a second set of network infrastructure devices,
  wherein the local area networks (LANs) of the second set of network infrastructure devices are characterized as similar to one another and different from LANs of the first set of network infrastructure devices.

8. A network infrastructure device, comprising:
  a plurality of network links across a wide area network (WAN);
  processing circuitry, and;
  a memory including instructions that, when executed by the processing circuitry, cause the network infrastructure device to:
    receive, from a network orchestrator, an initial DPS configuration;
    transmit a plurality of probes across the plurality of network links and receive a plurality of responses to the plurality of probes;
    transmit network operation information, including the plurality of responses, passively gathered application traffic information, available uplink bandwidth information, application bandwidth usage information, and service level agreement (SLA) violations by application category, to the network orchestrator;
    receive, from the network orchestrator, an updated DPS configuration.

9. The network infrastructure device of claim 8, wherein the network operation information further includes: geographic location, per-uplink internet service provider, and data traffic seasonality.

10. The network infrastructure device of claim 8, wherein the initial DPS configuration and the updated DPS configuration are generated by a machine learning model of the network orchestrator.

11. The network infrastructure device of claim 10, wherein the machine learning model uses forest regression models to predict SLAs and uplink health and available bandwidth for use generating DPS configurations.

12. The network infrastructure device of claim 8, further including instructions that cause the network infrastructure device to:
  route data traffic of a first application across a first uplink of the plurality of network links based on an initial DPS policy associated with the first application.

13. The network infrastructure device of claim 12, further including instructions that cause the network infrastructure device to:
  route data traffic of a first application across a second uplink of the plurality of network links based on an updated DPS policy associated with the first application.

14. The network infrastructure device of claim 13, further including instructions that cause the network infrastructure device to:
  route data traffic of a second application across the first uplink and the second uplink of the plurality of network links based on an updated DPS policy associated with the second application.

15. A method, comprising:
  receiving, at a network infrastructure device of a local area network (LAN) and from a network orchestrator, an initial dynamic path selection (DPS) configuration;
  configuring, at the network infrastructure device, an initial DPS policy for a class of applications based on the initial DPS configuration;
  transmitting probes from the network infrastructure device across a plurality of network links across a wide area network (WAN) that includes the LAN;
  based on the initial DPS policy, routing network traffic associated with the class of applications through the plurality of network links;
  gathering, at the network infrastructure device, network operation information, including responses to the transmitted probes, passively gathered application traffic information, available uplink bandwidth information, application bandwidth usage information, and service level agreement (SLA) violations by application category;
  transmitting the network operation information from the network infrastructure device to the network orchestrator;
  receiving, at the network infrastructure device, an updated DPS configuration from the network orchestrator;
  configuring, at the network infrastructure device, an updated DPS policy for the class of applications based on the updated DPS configuration; and
  based on the updated DPS policy, routing network traffic associated with the class of applications through the plurality of network links.

16. The method of claim 15, further comprising:
  classifying, at the network orchestrator, each uplink of the plurality of network links based on how consistently the link meets application SLAs for network traffic transmitted across the respective link, as well as by what margin the link meets the application SLAs;
  periodically generating, at the network orchestrator, updated DPS policies for the network infrastructure device to reduce the number of network links classified as not meeting or not consistently meeting their respective assigned application SLAs; and
  periodically updating, by the network orchestrator, an application SLA when all associated uplinks are classified as not meeting the current application SLA.

17. The method of claim 16, further comprising periodically adjusting an application SLA when all associated uplinks are classified as meeting the application SLA by a large margin.

18. The method of claim 15, wherein the updated DPS configuration received from the network orchestrator is generated based on predicting an SLA for each application class and predicting uplink health and available bandwidth for the network infrastructure device using a machine learning model.

19. The method of claim 18, wherein the machine learning model uses forest regression models to predict the SLAs and the uplink health and available bandwidth.

20. The method of claim 18, wherein the machine learning model is periodically trained using the network operation information from the network infrastructure device as well as network operation information from network infrastructure devices of LANs similar to the LAN of the network infrastructure device.

* * * * *